United States Patent Office 3,463,746
Patented Aug. 26, 1969

3,463,746
PARTICLE BOARD
James David Murdock, St. Hilaire, Quebec, and John Arthur Sharp, Beloeil, Quebec, Canada, assignors to Canadian Industries Limited, Montreal, Quebec, Canada, a corporation of Canada
No Drawing. Filed Nov. 21, 1966, Ser. No. 601,274
Claims priority, application Canada, Nov. 27, 1965, 946,438
Int. Cl. C08g 51/18; B32b 21/02
U.S. Cl. 260—9                                     6 Claims

ABSTRACT OF THE DISCLOSURE

A particle board formed of wood particles bonded by a thermosetting adhesive composition containing a dihydropyranyl compound, an acidic catalyst and, optionally, a compound containing hydroxyl groups such as an aliphatic hydrocarbon insoluble product derived from pine wood (Vinsol) or an ethylenically unsaturated polyester or mixtures thereof. The adhesive is cured by heating the adhesive coated wood particles at a temperature of 180° F. to 400° F. under pressure of 200 to 400 pounds per square inch. The particle board is water resistant.

---

This invention relates to a novel adhesive and to particle board fabricated therewith.

It is known to fabricate particle board from wood fragments such as chips using a thermosetting resin to bond the particles together. Such resin-bonded particle board is a well known article of commerce. Among the resins that have been employed for bonding, there may be mentioned phenol-formaldehyde, cresol-formaldehyde, resorcinol-formaldehyde, melamine-formaldehyde, urea-formaldehyde and condensed furfuryl alcohol resins. The water resistance of the resin-bonded particle board is dependent upon the nature of the bonding resin. The commonly employed urea-formaldehyde resin results in a particle board that is satisfactory for use in dry environments only, the water resistance being deficient. A water-resistant particle board can be produced using phenol-formaldehyde or melamine-formaldehyde resins as binders but such board is more costly and thus cannot compete with an alternative material, plywood. Since there exists a large potential field of use in the building industry for water-resistant particle board, it is of evident commercial advantage to provide a low-cost, water-resistant product.

It has been found that a water-resistant particle board suitable for outdoor applications and of competitive cost can be fabricated from wood particles bonded by a thermosetting adhesive comprising a cyclic vinyl ether containing at least two dihydrophyranyl groups per molecule. Particle boards bonded with the novel adhesive have a perpendicular tensile strength of greater than 50 p.s.i. and possess resistance to boiling water similar to particle boards bonded with phenol-formaldehyde resins. The novel particle boards can be fabricated employing standard industrial press equipment.

It is a primary object of this invention to provide a resin-bonded particle board suitable for outdoor applications. A further object is to provide a resin-bonded particle board of competitive cost. Additional objects will appear hereinafter.

The particle board of this invention comprises wood particles bonded together by an adhesive composition selected from the group consisting of:

(1) Mixtures of an acidic catalyst and a mixed dimeric, trimeric aldol condensate of 2-formyl-3,4-dihydro-2H-pyran, (2) Mixtures of an acidic catalyst, an aliphatic hydrocarbon-insoluble product derived from pine wood and known commercially by the trademark designation of "Vinsol" resin and a mixed dimeric, trimeric aldol condensate of 2-formyl-3,4-dihydro-2H-pyran, (3) Mixtures of an acidic catalyst, an ester containing at least two dihydropyranyl groups per molecule, and a hydroxyl group-containing ethylenically unsaturated polyester, and (4) Mixtures of an acidic catalyst, an ester containing at least two dihydropyranyl groups per molecule, a hydroxyl group-containing ethylenically unsaturated polyester, and an aliphatic hydrocarbon-insoluble product derived from pine wood and known commercially by the trademark designation of "Vinsol" resin.

The wood particles suitable for fabricating the particle board are normally in the size range between 4 to 20 mesh. The usual source of the wood particles is the waste from wood manufacturing. It is necessary to separate the fine sawdust from the material since the presence of this material results in excess absorption of bonding resin. The wood particles normally will be employed when they have a moisture content of from 6% to 10% by weight. In the case of certain types of wood waste it may be necessary to reduce the size of the wood chips by further grinding.

The mixed dimeric, trimeric aldol condensate of 2-formyl-3,4-dihydro-2H-pyran is prepared by condensing 2-formyl-3,4-dihydro-2H-pyran (acrolein dimer) under substantially anhydrous conditions in the presence of an alkaline catalyst, the product of the condensation being a mixture of 2-(2-formyl-3,4-dihydro-2H-pyran)-2-(3,4-dihydro-2H-pyran) carbinol of formula

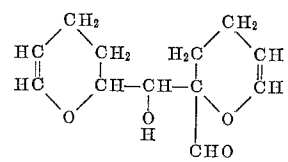

and trimeric species comprising materials having the formulas

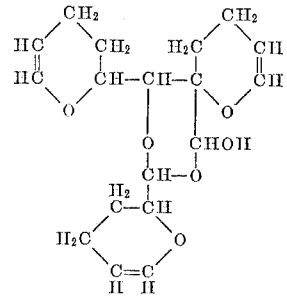

and

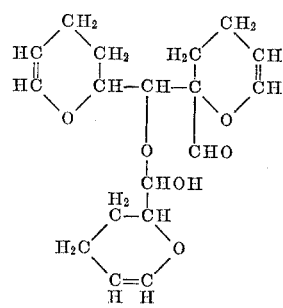

The esters containing at least two dihydropyranyl groups per molecule are described by the formula

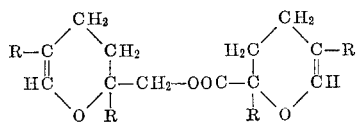

where R is hydrogen or an alkyl group. An example of such compounds is 3,4-dihydro-2H-pyran-2-methyl-(3,4-dihydro-2H-pyran-2-carboxylate).

The acidic catalysts suitable as ingredients of the adhesive composition include the strong proton-donating acids such as p-toluenesulphonic acid and Lewis acids such as boron trifluoride, the latter being conveniently employed as the etherate, $BF_3 \cdot (C_2H_5)_2O$. Other suitable catalysts are phosphoric acid, perchloric acid, acetic acid, trifluoroacetic acid, trichloroacetic acid, fluoboric acid, fluosilicic acid, mixtures of fluoboric acid and fluosilicic acid, tetradecanol p-toluene-sulphonic ester, ethyl sulphuric acid potassium salt, dipropane sulphonic acid sodium salt, 2-amino naphthalene sulphonic acid-1, and 1-amino naphthalene sulphonic acid-8.

"Vinsol" is a trademark designation for a hard, brittle, nontacky, high-melting, thermoplastic material which appears black in reflected light and which is ruby red when viewed by transmitted light through thin sections. It is an extract of pine wood, such as southern pine, particularly the stump, and is composed of a complex mixture of acidic materials derived from rosin acids and oxidized rosin acids, neutral high molecular weight compounds, and acidic phenolic materials in the form of substituted phenolic ethers, polyphenols, and other high molecular weight phenols. It is gasoline-insoluble and aromatic hydrocarbons-soluble; is saponifiable and esterifiable with polyhydric alcohols; and has an acid number of 90 to 105. Typical analysis values for it are: saponifiable number 165; methoxyl ($-OCH_3$) content (ASTM or AOAC) percent 5.3; density (at 25° C.) 1.218; softening point 110° C. minimum, 125° C. maximum; gasoline soluble 20 percent maximum; and toluene insoluble 25 percent maximum.

The hydroxyl group-containing ethylenically unsaturated polyesters are prepared by the esterification of an ethylenically unsaturated dicarboxylic acid with a triol and a diol in such proportions that the resultant polyester contains at least three free hydroxyl groups per molecule. Suitable unsaturated dicarboxylic acids are maleic and fumaric acids. Suitable triols are trimethylol ethane and trimethylol propane. Suitable diols are 1,3 butylene glycol, 1,4-butanediol, neopentyl glycol, diethylene glycol and dipropylene glycol. The polyesters are low molecular weight polymers.

The wood adhesive is employed in proportion of from 5% to 25% by weight of wood particles used in the particle board. The catalyst is employed in proportions of from 0.25% to 7.0% by weight of the wood particles. Since large proportions of catalyst tend to result in a darkening of the particle board, less than maximum quantities are preferred.

When the adhesive composition contains an aliphatic hydrocarbon-insoluble product derived from pine wood ("Vinsol" resin) and a mixed dimeric, trimeric aldol condensate of 2-formyl-3,4-dihydro-2H-pyran, these two ingredients may be present in respective relative proportions ranging from 1:1 to 0:1.

When the adhesive composition contains an ester having at least two dihydropyranyl groups per molecule and a hydroxyl group-containing ethylenically unsaturated polyester, these two ingredients may be present in respective relative proportions ranging from 1:0.6 to 1:1.2. When the adhesive composition contains an ester having at least two dihydropyranyl groups per molecule, a hydroxyl group-containing ethylenically unsaturated polyester and an aliphatic hydrocarbon-insoluble product derived from pine wood ("Vinsol" resin), the proportion of the last mentioned ingredient may vary from complete absence to an amount equal to the total weight of the other two of said ingredients.

The particle board is fabricated by spraying the wood particles, having a moisture content of 6% to 10% by weight, with a solution or dispersion of the adhesive. If desired the catalyst may be sprayed on the wood particles separately from the remainder of the adhesive composition. The wood particles coated with adhesive are next placed in a press and subjected to pressure in the range of 200 to 400 pounds per square inch and temperature in the range 180° F. to 400° F. for a period of from 5 to 60 minutes. The longer pressing periods result in an increase in strength of the particle board but do not substantially affect the moisture absorption of the board.

The particle board of this invention has a tensile strength comparable to that of commercial particle board wherein the adhesive is phenol-formaldehyde or urea-formaldehyde resin. The water-absorption of the particle board of this invention is comparable to that of commercial phenol-formaldehyde bonded particle board and superior to that of commercial urea-formaldehyde bonded particle board.

The invention is additionally illustrated by the following examples.

EXAMPLES 1 TO 9

Commercial wood shavings, being the waste from lumber manufacturers, were screened and the fraction passing a 4 mesh screen but resting on an 8 mesh screen was used. The 4 to 8 mesh fraction was allowed to reach a moisture content in equilibrium with the atmosphere, approximately 10% by weight.

A specified amount of cyclic vinyl ether and in certain cases a polyhydroxyl compound were dissolved in acetone containing a red dye to permit observation of the uniformity of the binder distribution. When the catalyst was p-toluenesulphonic acid, it was dissolved also in the acetone solution. Boron trifluoride etherate solution in diethylene glycol and a 91:9 mixture of fluoboric acid and fluosilicic acid as a 47% solution in water when employed as catalysts were sprayed on the wood chips prior to spraying of the binder solution.

After the binder and catalyst had been uniformly distributed over the wood chips, the solvent was allowed to evaporate and the coated chips were placed in a stainless steel disc mould approximately 1 inch deep and 5 inches in diameter. For pressing at temperatures below 350° F., a polyethylene terephthalate polyester sheet was placed on both faces of the mould to prevent adhesion of the particle board to the mould. At higher temperatures aluminum foil was used for this purpose. The mould was then placed in a hot press under desired conditions of temperature, pressure and time of pressing.

After removal from the mould, the particle board was allowed to cool and its density, perpendicular tensile strength and water absorption were measured.

The perpendicular tensile strength was measured employing a 2" by 2" piece of the board which was bonded on opposite faces to two steel clamps having 2" by 2" faces using polyvinyl acetate ("Bondfast") adhesive. The steel clamps were attached to the jaws of a Hounsfield tensometer and pulled apart at constant speed until the particle board broke. The tension at which the board broke was recorded.

Water absorption was determined by immersing a weighed 5 inch diameter semi circle of board in water at 70° F. for 20 hours, wiping off surface water and reweighing. A second test was carried out by placing a sample of board in boiling water for 30 minutes and determining the water absorption.

The particle board prepared and their characteristics are shown in the following table which shows also comparable tests of commercial particle boards bonded by phenol-formaldehyde and urea-formaldehyde resins. In the table:

Acrolein hexamer is the mixed dimeric, trimeric aldol condensate of 2-formyl-3,4-dihydro-2H-pyran described hereinbefore.

Acrolein tetramer is 3,4-dihydro-2H-pyran-2-methyl-(3,4-dihydro-2H-pyran-2-carboxylate).

$HBF_4/H_2SiF_6$ is a 91:9 mixture of fluoboric acid and fluosilicic acid as 47% solution in water.

TME is a hydroxyl group-containing ester derived from equimolar proportions of trimethylol ethane, maleic anhydride and dipropylene glycol.

What we claim is:

1. A particle board which comprises wood particles having a moisture content of from 6% to 10% by weight bonded together by an adhesive composition selected from the group consisting of (1) mixtures of an acidic catalyst selected from the group consisting of strong proton-donating acids and Lewis acids and a mixed dimeric, trimeric aldol condensate of 2-formyl-3,4-dihydro-2H-pyran, (2) mixtures of an acidic catalyst selected from the group consisting of strong proton-donating acids and Lewis acids, a hard, brittle, nontacky, high-melting, thermoplastic material which appears black in reflected light and which is ruby red when viewed by transmitted light through thin sections; being an extract of pine wood, such as southern pine, particularly the stump; and being composed of a complex mixture of acidic materials derived from rosin acids and oxidized rosin acids, neutral high molecular weight compounds, and acidic phenolic materials in the form of substituted phenolic ethers, polyphenols, and other high molecular weight phenols; being gasoline-insoluble and aromatic hydrocarbon-soluble, being saponifiable and esterifiable with polyhydric alcohols, and having an acid number of 90 to 105; with typical analysis values of: saponifiable number 165; methoxyl ($-OCH_3$) content (ASTM or AOAC) percent 5.3; density at 25° C. 1.218; softening point 110° C. minimum, 125° C. maximum; gasoline-soluble 20 percent maximum; and toluene insoluble, 25 percent maximum, and a mixed dimeric, trimeric aldol condensate of 2-formyl-3,4-dihydro-2H-pyran, the last two ingredients being present in proportions in the range 1:1 to 0:1 by weight, (3) mixtures of an acidic catalyst selected from the group consisting of strong proton-donating acids and Lewis acids, an ester containing at least two dihydropyranyl groups per molecule, and an ethylenically unsaturated polyester containing at least three free hydroxyl groups per molecule, the last two ingredients being present in proportions in the range 1:0.6 to 1:1.2 by weight, and (4) mixtures of an acidic catalyst selected from the group consisting of strong proton-donating acids and Lewis acids, an ester containing at least two dihydropyranyl groups per molecule, an ethylenically unsaturated polyester containing at least three free hydroxyl groups per molecule, and a hard, brittle, nontacky, high melting, thermoplastic material which appears black in reflected light and which is ruby red when viewed by transmitted light through thin sections; being an extract of pine wood, such as southern pine, particularly the stump; and being composed of a complex mixture of acidic materials derived from rosin acids and oxidized rosin acids, neutral high molecular weight compounds, and acidic phenolic materials in the form of substituted phenolic ethers, polyphenols, and other high molecular weight phenols; being gasoline-insoluble and aromatic hydrocarbon-soluble, being saponifiable and esterifiable with polyhydric alcohols, and having an acid number of 90 to 105; with typical analysis values of: saponifiable number 165; methoxyl ($-OCH_3$) content (ASTM or AOAC) percent 5.3; density at 25° C. 1.218; softening point 110° C. minimum, 125° C. maximum; gasoline soluble, 20 percent maximum; toluene insoluble, 25 percent maximum, the last three ingredients being present in proportions in the range 1:0.6:0 to 1:1.2:2.2 by weight, the adhesive

TABLE

| Example | Binder Composition — Resin, percent wt. of wood | Binder Composition — Catalyst, percent wt. of wood | Pressing conditions, time 60 min. — Temp., °F. | Pressing conditions — Press., p.s.i. | Board characteristics — Density, g./cc. | Board characteristics — Tensile strength, lb. sq./in. | Water absorption — 20 hrs. at 70° F., percent dry wt. | Water absorption — 30 min. at 212° F., percent dry wt. |
|---|---|---|---|---|---|---|---|---|
| 1 | 7% acrolein hexamer | 1% boron trifluoride etherate | 400 | 250 | 0.77 | 275 | 53.9 | 38.9 |
| 2 | 7% acrolein hexamer, 2% vaseline | 0.5% $HBF_4/H_2SiF_6$ | 400 | 250 | 0.61 | 101 | 26.5 | 120.0 |
| 3 | 7% acrolein, tetramer/TME 1:1 | 0.5% p-toluene sulphonic acid | 400 | 200 | 0.71 | 115 | 48.7 | 74.0 |
| 4 | do | 1% boron trifluoride etherate | 400 | 200 | 0.72 | >100 | 48.0 | 31.7 |
| 5 | do | 0.25% boron trifluoride etherate | 400 | 200 | 0.71 | >165 | 62.7 | 82.6 |
| 6 | do | 0.5% p-toluene sulphonic acid | 400 | 250 | 0.68 | 105 | 42.0 | 69.6 |
| 7 | 7% acrolein tetramer/TME 1:1, 2% vaseline | do | 400 | 200 | 0.77 | >100 | 51.4 | — |
| 8 | 4% acrolein tetramer/TME 1:1, 4% "Vinsol" | do | 400 | 350 | 0.79 | 127 | 41.6 | 53.4 |
| 9 | do | 1% $HBF_4/H_2SiF_6$ | 400 | 200 | 0.73 | >100 | 45.6 | 42.6 |
| 10 | Commercial phenol-formaldehyde bonded particle board | | | | 0.68 | 104 | 41.0 | 69.0 |
| 11 | Commercial urea-formaldehyde bonded particle board "A" | | | | 0.68 | 95 | 33.3 | 143.0 |
| 12 | Commercial urea-formaldehyde bonded particle board "B" | | | | 0.70 | 75 | — | 134.0 | composition comprising from 5% to 25% by weight of the wood particles and the acidic catalyst comprising from 0.25% to 7.0% by weight of the wood particles.

2. A particle board as claimed in claim 1 wherein the acidic catalyst of the adhesive composition is selected from the group consisting of p-toluene sulphonic acid, boron trifluoride and mixtures of fluoboric acid and fluosilicic acid.

3. A particle board as claimed in claim 1 wherein the adhesive composition contains the dihydropyranyl group-containing ester 3,4-dihydro-2H-pyran-2-methyl-(3,4-dihydro-2H-pyran-2-carboxylate).

4. A particle board as claimed in claim 1 wherein the adhesive composition contains a hydroxyl group-containing polyester derived from equimolar proportions of trimethylol ethane, maleic anhydride and dipropylene glycol.

5. A process for the fabrication of the particle board claimed in claim 1 comprising (A) coating wood particles having a moisture content of 6% to 10%, by weight with 5% to 25%, by weight of the wood particles, of the adhesive composition of claim 5, and (B) compressing the coated wood particles at a pressure of from 200 to 400 pounds per square inch at a temperature of from 180° F. to 400° F. for a period of from 5 to 60 minutes.

6. An adhesive composition adapted for the bonding of particle board selected from the group consisting of (1) mixtures of an acidic catalyst selected from the group consisting of strong proton-donating acids and Lewis acids and a mixed dimeric, trimeric aldol condensate of 2-formyl-3,4-dihydro-2H-pyran, (2) mixtures of an acidic catalyst selected from the group consisting of strong proton-donating acids and Lewis acids, a hard, brittle, nontacky, high-melting, thermoplastic material which appears black in reflected light and which is ruby red when viewed by transmitted light through thin sections; being an extract of pine wood, such as southern pine, particularly the stump; and being composed of a complex mixture of acidic materials derived from rosin acids and oxidized rosin acids, neutral high molecular weight compounds, and acidic phenolic materials in the form of substituted phenolic ethers, polyphenols, and other high molecular weight phenols; being gasoline-insoluble and aromatic hydrocarbon-soluble, being saponifiable and esterifiable with polyhydric alcohols, and having an acid number of 90 to 105; with typical analysis values of: saponifiable number 165; methoxyl ($-OCH_3$) content (ASTM or AOAC) percent 5.3; density at 25° C. 1.218; softening point 110° C. minimum, 125° C. maximum; gasoline-soluble 20 percent maximum; and toluene insoluble, 25 percent maximum, and a mixed dimeric, trimeric aldol condensate of 2-formyl-3,4-dihydro-2H-pyran the last two ingredients being present in proportions in the range 1:1 to 0:1 by weight, (3) mixtures of an acidic catalyst selected from the group consisting of strong proton-donating acids and Lewis acids, an ester containing at least two dihydro-pyranyl groups per molecule, and an ethylenically unsaturated polyester containing at least three free hydroxyl groups per molecule, the last two ingredients being present in proportions in the range 1:0.6 to 1:1.2 by weight, and (4) mixtures of an acidic catalyst selected from the group consisting of strong proton-donating acids and Lewis acids, an ester containing at least two dihydropyranyl groups per molecule, an ethylenically unsaturated polyester containing at least three free hydroxyl groups per molecule, and a hard, brittle, nontacky, high melting, thermoplastic material which appears black in reflected light and which is ruby red when viewed by transmitted light through thin sections; being an extract of pine wood, such as southern pine, particularly the stump; and being composed of a complex mixture of acidic materials derived from rosin acids and oxidized rosin acids, neutral high molecular weight compounds, and acidic phenolic materials in the form of substituted phenolic ethers, polyphenols, and other high molecular weight phenols; being gasoline-insoluble and aromatic hydrocarbon-soluble, being saponifiable and esterifiable with polyhydric alcohols, and having an acid number of 90 to 105; with typical analysis values of: saponifiable number 165; methoxyl ($-OCH_3$) content (ASTM or AOAC) percent 5.3; density at 25° C. 1.218; softening point 110° C. minimum, 125° C. maximum; gasoline-soluble, 20 percent maximum; toluene insoluble, 25 percent maximum the last three ingredients being present in proportions in the range 1:0.6:0 to 1:1.2:2.2 by weight, the catalyst comprising from 5% to 28% by weight of the adhesive composition.

References Cited

UNITED STATES PATENTS

| | | | |
|---|---|---|---|
| 2,399,804 | 12/1942 | Hills et al. | 260—24 |
| 2,481,377 | 9/1949 | Whetstone | 260—345.8 |
| 2,514,172 | 7/1950 | Whetstone et al. | 260—345.8 |
| 2,817,617 | 12/1957 | Rogers | 260—24 |
| 3,223,660 | 12/1965 | Pulver et al. | 260—23 |

DONALD E. CZAJA, Primary Examiner

W. E. PARKER, Assistant Examiner

U.S. Cl. X.R.

161—168; 260—24, 67, 75, 867